M. J. WEBER.
WEIGHING SCALE.
APPLICATION FILED NOV. 20, 1915.

1,210,382.

Patented Dec. 26, 1916.
2 SHEETS—SHEET 1.

Witnesses
A. H. Opsahl.
G. F. Williamson

Inventor
M. J. Weber.
By his Attorneys
Williamson & Merchant

M. J. WEBER.
WEIGHING SCALE.
APPLICATION FILED NOV. 20, 1915.
1,210,382.
Patented Dec. 26, 1916.
2 SHEETS—SHEET 2.
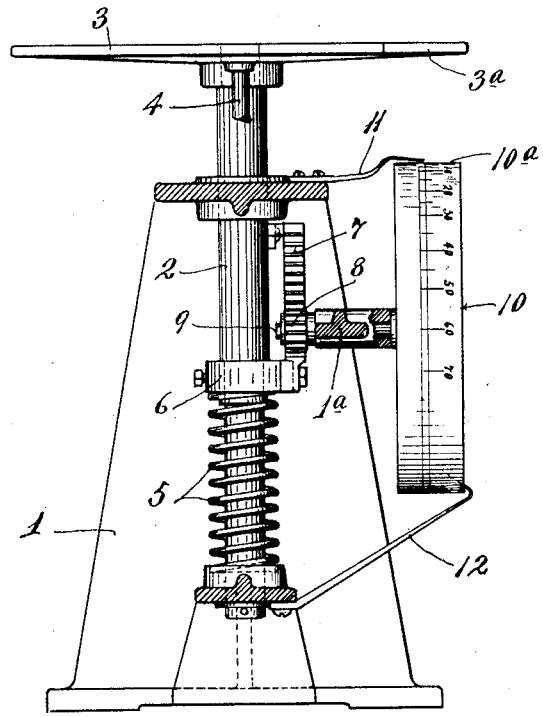
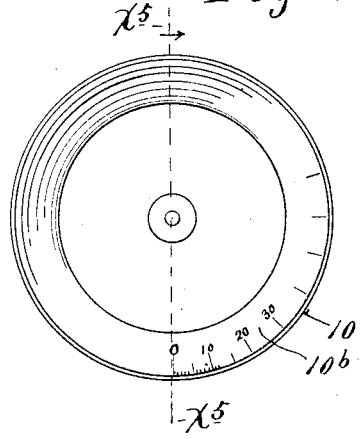
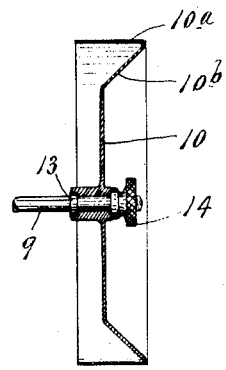
Witnesses.
A. H. Opsahl.
G. F. Williamson
Inventor.
M. J. Weber.
By his Attorneys.
Williamson Merchant

UNITED STATES PATENT OFFICE.

MATHIAS J. WEBER, OF CHICAGO, ILLINOIS, ASSIGNOR TO MASON, DAVIS & CO., OF CHICAGO, ILLINOIS, A CORPORATION OF MAINE.

WEIGHING-SCALE.

1,210,382.  Specification of Letters Patent.  Patented Dec. 26, 1916.

Application filed November 20, 1915. Serial No. 62,513.

*To all whom it may concern:*

Be it known that I, MATHIAS J. WEBER, a citizen of the United States, residing at Chicago, in the county of Cook and State of Illinois, have invented certain new and useful Improvements in Weighing-Scales; and I do hereby declare the following to be a full, clear, and exact description of the invention, such as will enable others skilled in the art to which it appertains to make and use the same.

My invention has for its object to provide an improved scale, and to such ends, generally stated, the invention consists of the novel devices and combinations of devices hereinafter described and defined in the claims.

The scale designed in accordance with my invention is of the character wherein the weight is automatically indicated and no hand shifted parts are required to effect the proper weight indication. It comprises a suitable base, a spring-supported platform, a rotary dial and coöperating pointer for indicating the weight on the platform. A scale of this character is adapted for use in weighing various different articles and things, and is especially well adapted for weighing persons standing on the platform thereof, the indicator being so arranged that it may be seen by the person being thus weighed.

In the accompanying drawings which illustrate the invention, like characters indicate like parts throughout the several views.

Figure 1:
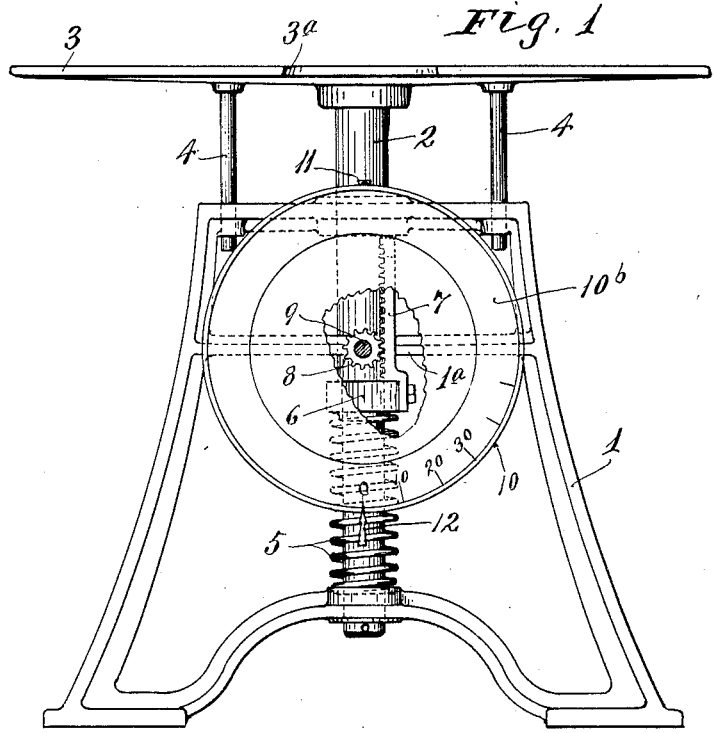
Figure 2:
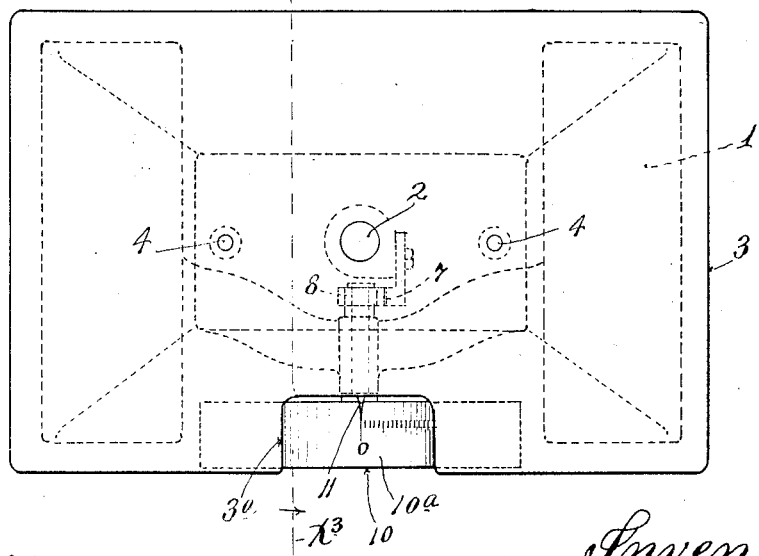

Referring to the drawings, Figure 1 is a view in front elevation showing the improved scale; Fig. 2 is a plan view thereof; Fig. 3 is a vertical section taken approximately on the line $x^3-x^3$ of Fig. 2, some parts being shown in full; Fig. 4 is a face view of the dial or graduated wheel; and Fig. 5 is a section taken on the line $x^5-x^5$ of Fig. 4.

The numeral 1 indicates, as an entirety, the scale base or frame which, as shown, is a cast structure. Working vertically through suitable bearings on this frame is a heavy plunger 2 provided at its upper end with a platform 3. The platform 3, on opposite sides of the plunger 2 is provided with rigidly secured depending parallel guide rods 4 that work loosely through perforations on the top of the frame 1 and hold the platform and plunger against rotation, but free for vertical movements. The platform and plunger are supported by a properly tensioned coiled spring 5 interposed between a raised base flange of the frame 1 and a collar 6 on the plunger 2. Rigidly secured to the collar 6 is a vertical rack 7 that engages a small spur pinion 8 secured on a short horizontal shaft 9 journaled in a bearing afforded by a cross bar $1^a$ of the frame 1. At its outer end, the shaft 9 carries a dial in the form of a wheel 10 having a peripheral cylindrical flange $10^a$ and an oblique or conical web $10^b$. Preferably, both the peripheral flange $10^a$ and conical web $10^b$ are graduated circumferentially to indicate pounds and fractions thereof, in movements of the dial, under the weight on the platform, as resisted by the spring 5. A pointer 11 is secured to and projected from the upper portion of the frame 1 and coöperates with the graduated peripheral flange $10^a$; and another pointer 12 secured to the lower portion of the frame 1, coöperates with the graduated conical web $10^b$. The central portion of the front edge of the platform 3 is cut away, as shown at $3^a$, so that the end of the pointer 11 and graduations on the peripheral flange $10^a$ may be seen by a person standing on the platform 3. The graduations on the conical web $10^b$ may be readily seen by a person standing in front of the scale and they may also be seen by the person on the platform, when his head is inclined forward. A scale of this character is not only of small cost, strong, and durable, but efficient for the purposes had in view.

The term "pointer" is herein used in a broad sense to indicate any kind of a line, mark, or device which will coöperate with the graduations on the movable scale to point out or designate the weight of the object on the scale. The dial or wheel is made removable from the crank shaft 9, preferably, by means of a knurled nut 11 which clamps the same against the flange 12 on the said shaft.

What I claim is:

1. In a scale, the combination with a frame, of a spring-supported platform movable vertically on said frame, a dial set in an approximately vertical plane and rotatably mounted on said frame, connections between said dial and platform whereby the former will be rotated by vertical movement of the latter, and a pointer secured in respect to said frame and overlying said dial, and the front end of said platform projecting over said dial but having a notch directly above said pointer, whereby the said pointer and extreme upper portion of said dial may be seen by a person standing on the platform.

2. In a scale, the combination with a frame, of a spring-supported platform movable vertically on said frame, a dial set approximately on a vertical plane and mounted to rotate on said frame, connections between said dial and platform whereby the former will be rotated by vertical movements of the latter, said dial being in the form of a wheel having a graduated peripheral cylindrical surface and a graduated annular face surface, and pointers secured in respect to said frame and coöperating, one with each of the graduated surfaces of said dial.

3. In a scale, the combination with a frame of a spring-supported platform movable vertically on said frame, a dial rotatably mounted on said frame, connections between said dial and platform whereby the former will be rotated by vertical movements of the latter, the said dial being in the form of a wheel having a graduated peripheral cylindrical flange and a graduated conical web, and pointers secured in respect to said frame and coöperating one with said graduated peripheral flange and one with said graduated conical surface.

In testimony whereof I affix my signature in presence of two witnesses.

MATHIAS J. WEBER.

Witnesses:
DONALD D. DAVIDSON,
E. C. ROWE.